April 16, 1935.    J. NEFF    1,998,382
PROCESS FOR REMOVING BATCHES OF GOODS

Filed May 19, 1931

Inventor:
J. Neff.

Patented Apr. 16, 1935

1,998,382

UNITED STATES PATENT OFFICE 1,998,382

PROCESS FOR REMOVING BATCHES OF GOODS

Johannes Neff, Dresden, Germany, assignor to Universelle Cigarettenmaschinen-Fabrik J. C. Muller, Dresden, Germany Application May 19, 1931, Serial No. 538,582 In Germany December 19, 1930

12 Claims. (Cl. 226—5)

In the packing of batches of goods, such for instance as cigarettes, it is the general custom to collect the batches on conveyer belts or the like and by further movement of the conveyer belts to place them opposite the packing boxes. The problem then arises of transferring the batches of goods from the collecting band to the container.

This problem can be solved in a relatively simple manner if the collecting band is moved intermittently. In this case, the batches of goods can be thrust into the container which is held ready by means of a plunger at a position which always remains the same.

It necessitates, however, rapid operation so that not only are the batches of goods themselves moved forward continuously on their conveying device, but the containers also are carried by a conveying device which moves continuously.

Although for this case also it has already been proposed to arrange slides on chains running obliquely to the forward movement of the conveyer device, this does not provide a complete solution of the problem because in this operation the plunger must be removed from the path by raising or swinging it out, and besides the disadvantages associated with belt driving, such as sagging of the belt and the like, have to be contended with.

The positively actuated, relatively stationary reciprocating slide still remains the surest means of guiding.

According to the present invention, the use of such a slide is rendered possible in that a conveyer belt running continuously at a uniform speed co-operates with a plunger moved transversely to the feeding direction of the band in such manner that, during its working stroke, this plunger is moved in the feeding direction of the band and at its delivery speed, but remains stationary during the return movement which is carried out at increased speed.

The plunger is preferably actuated by gearing which during the reciprocating movement is also rotated to and fro in the delivery direction of the belt, a free-wheel device being inserted in the gearing which stops the rotation of the plunger-actuating shaft during the accelerated return movement.

In particular, the plunger guide may be mounted on a sliding member moved by crank mechanism or the like in the delivery direction of the belt, the plunger being connected with a crank mechanism, the crankshaft of which is mounted on the sliding member and by means of gearing engages with a stationary rack in such manner that by displacing the toothed wheel on the rack during the movement of the sliding members the to and fro rotation is produced, and the crankshaft is provided with a free-wheel device of known type.

The invention is illustrated in the annexed drawing, in which:—

Figure 1:
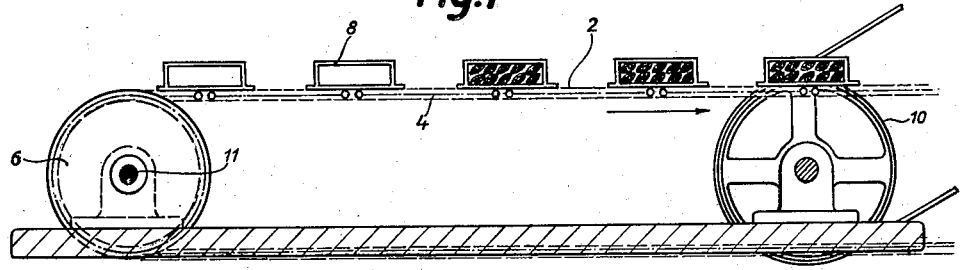
Fig. 1 is a side view of the conveyer belt for the batches of goods.
Figure 2:
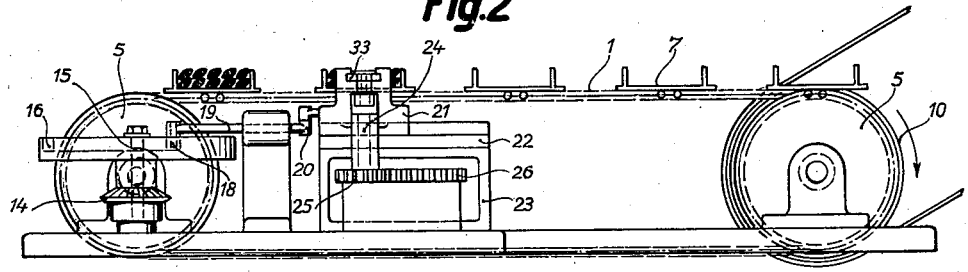
Fig. 2 is a side view of the plunger device connected with this conveyer belt.
Figure 3:
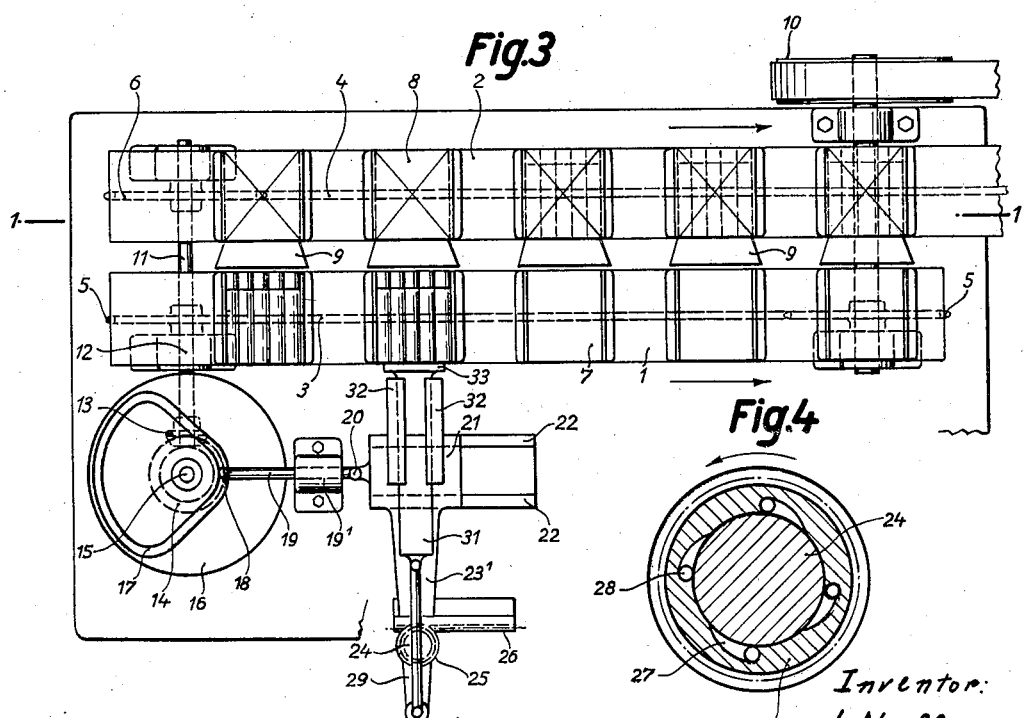
Fig. 3 is a plan.

As may be seen from Fig. 3, the two conveyer belts 1 and 2 run parallel to one another. These conveyer belts are carried by the chains 3 and 4, which run over the sprocket wheels 5—5 or 6—6. On the chain 3 of the conveyer belt 1 are mounted the carrier members 7 for the batches of goods, while on the chain 4 for the conveyer 2 are the carrier members 8 for the containers into which the goods are to be inserted. In this operation a mouthpiece 9 is interposed which facilitates the transfer of the goods from the carrier 7 into the container on the carrier 8.

It should be pointed out that the endless belts 1 and 2 are moved in the same direction (indicated by the arrows in Fig. 3) and at the same speed. The drive is supplied by the belt pulley 10.

The shaft 11 of the sprocket wheels 5 and 6 shown on the inner side (in the drawing), by means of an extension 12 carries the bevel wheel 13, which by means of the bevel wheel 14 drives the vertical shaft 15 of a cam 16, in the cam grooves 17 of which the pin 18 of a push-rod 19 engages, which at 19' is guided horizontally and parallel to the feeding direction of the delivery belts 1 and 2. At 20 this push-rod 19 is pivotally connected to a slide member 21 which is moved in the parallel guides 22 on the sliding member 23 horizontally and parallel to the conveyer belts 1 and 2. At the end of this slide member is a downwardly directed extension in the form of the projection 23', and at the end of the extension is a vertical crankshaft 24 at the bottom end of which a cogwheel 25 is arranged which engages with the stationary rack 26.

Figure 4:
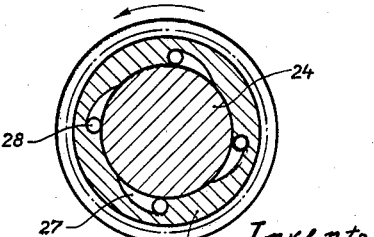
Fig. 4 is a horizontal cross-section through the known free-wheel device used.

In Fig. 4 this cogwheel is shown on an enlarged scale. Here it can be seen that the cogwheel has a rim 25' and a central portion which is formed by the shaft 24. In the rim member are provided recesses 27 which serve to accommodate the balls or rollers 28. When the shaft 24 is stationary and the cogwheel is rotated in the direction indicated by the arrow in Fig. 4, the rollers 28 are jammed fast in the corresponding recesses, thus producing frictional resistance between the shaft 24 and the cogwheel 25, that is to say the shaft 24 is carried along by the rim 25'. When the cogwheel is moved in the opposite direction the balls or rollers 28 arrive in the position shown in Fig. 4 where they can rotate freely. Thus, in this position the shaft 24 remains stationary.

On the shaft 24 is mounted a crank arm which engages with a sliding member by means of a push rod 30. This slide 31 is adapted to be displaced longitudinally in the guides 32. The guides are mounted on the sliding members 21 transversely to the guides 22 of the sliding member 21. The front end 33 of the sliding member 31 forms the plunger which passes the batches of cigarettes from the carrier 7 of the endless belt through the respective mouthpiece 9 into the container in question which is carried by one of the carriers 8.

The drive of the sliding member 21 is so arranged that this sliding member during its movement from left to right is moved at the feeding speed of the conveyer belts 1 and 2.

During this working stroke of the sliding member 21 the plunger slide 31 is reciprocated by the crank mechanism 25—30, so that during the time the sliding member 21 moves to the right as indicated in the drawing, it transfers the batches of goods from the belt 1 into the containers of the belt which are held ready and then returns to its initial position.

The sliding member 21 is now reversed and the cogwheel 25 also reverses its movement. Now, however, the latter runs idle so that the crank shaft 24 is not rotated with it, and the plunger 33 remains stationary while the sliding member 21 returns to its initial position at increased speed. The operation is then repeated.

Having thus described the nature of the said invention and the best means I know of carrying the same into practical effect, I claim:—

1. An apparatus for filling containers with articles comprising a conveyor, means for continuously moving said conveyor along a certain path, a second conveyor arranged parallel to said first conveyor, means for continuously moving said second conveyor, a slide arranged parallel to said conveyors, means for reciprocating said slide, a plunger upon said slide positioned transversely to the direction in which said slide reciprocates and means for reciprocating said plunger so as to transfer articles carried by said first conveyor to said second conveyor.

2. An apparatus for filling containers with articles comprising a conveyor for continuously moving articles along a certain path, a second conveyor for continuously moving containers along a path parallel to said first-mentioned path, means for moving said conveyors, a cam rotated by said means for moving said conveyors, a cam follower operated by said cam so as to reciprocate in a path parallel to said conveyors, a slide connected to said cam follower, a plunger mounted upon said slide and means for reciprocating said plunger during the motion of said slide in one direction and retaining said plunger stationary during the opposite movement of said slide.

3. An apparatus for filling containers with articles comprising a conveyor, means for moving said conveyor continuously, a slide disposed parallel to said conveyor, means for reciprocating said slide, a plunger carried by said slide and means for reciprocating said plunger when the movement of said slide corresponds with the movement of said conveyor.

4. An apparatus for filling containers with articles comprising a conveyor, means for continuously moving said conveyor, a second conveyor disposed parallel to said first conveyor, means for continuously moving said second conveyor, a slide disposed parallel to said conveyors, means for reciprocating said slide, a plunger carried by said slide and means for reciprocating said plunger across said first-mentioned conveyor when the movement of said slide corresponds with the movement of said first conveyor.

5. An apparatus for filling containers with articles comprising a conveyor, means for continuously moving said conveyor, a second conveyor, means for continuously moving said second conveyor at a speed uniform with said first conveyor, a slide, means for reciprocating said slide parallel to said first conveyor, a plunger carried by said slide, a shaft, a crank connecting said shaft to said plunger, a pinion carried by said shaft, a stationary rack cooperating with said pinion and a one-way clutch disposed between said pinion and said shaft whereby said plunger can be reciprocated when the movement of said slide corresponds to the movement of said first conveyor and said plunger will remain stationary when the movement of said slide does not correspond with the movement of said conveyor.

6. The process of filling containers with articles comprising feeding the articles continuously along a path, feeding the containers to be filled with said articles continuously along a path, transferring said articles into said containers while said articles and said containers are moving continuously and then returning said transferring means in a direction opposite to the direction of motion of said articles and containers and in the same plane therewith so that successive articles may be transferred into successive containers.

7. An apparatus for filling containers with articles, comprising a conveyor continuously moving articles along a certain path, a second conveyor continuously moving containers along a certain path, and means for transferring said articles from said first conveyor into said containers upon said second conveyor while said conveyors are moving continuously, said transferring means having a reciprocating motion, one component of which motion is parallel to said second conveyor.

8. An apparatus for filling containers with articles, comprising a continuously moving conveyor for moving articles along a certain path, a second conveyor continuously moving containers along a certain path, a reciprocating plunger for transferring articles from said first conveyor into said containers upon said second conveyor while said conveyors are moving continuously, and a separate means for reciprocating said reciprocating plunger parallel to said second conveyor.

9. An apparatus for filling containers with articles, comprising a conveyor continuously moving articles along a certain path, a second conveyor continuously moving containers along a path parallel to said first-mentioned path, reciprocating means for passing said articles from said first conveyor into said articles upon said second conveyor, while said conveyors are moving continuously, and independent separate means for reciprocating said last-named means parallel to said second conveyor.

10. An apparatus for filling containers with articles, comprising a conveyor continuously moving articles along a certain path, a second conveyor continuously moving containers along a path parallel to said first-mentioned path, a slide, means for reciprocating said slide, a plunger carried by said slide for transferring said articles from said first conveyor into said containers upon said second conveyor while said conveyors are moving continuously, and means for reciprocating said plunger in a direction different from the direction of reciprocation of said slide.

11. An apparatus for filling containers with articles, comprising a conveyor, means for moving said conveyor continuously, a second conveyor, means for moving said second conveyor at a speed equal to the speed of movement of said first conveyor, a reciprocating plunger for transferring articles from said first conveyor to said second conveyor, and means separate and independent from the means for reciprocating said plunger for intermittently moving said plunger along a path to and fro parallel to said second conveyor.

12. An apparatus for filling containers with articles, comprising a conveyor, means for moving said conveyor continuously, a second conveyor, means for moving said second conveyor at a speed equal to the speed of movement of said first conveyor, a reciprocating plunger for transferring articles from said first conveyor to said second conveyor, and one component of the movement of the reciprocating plunger being in a direction parallel to said second conveyor.

JOHANNES NEFF.